(12) United States Patent
Jones et al.

(10) Patent No.: US 6,180,914 B1
(45) Date of Patent: Jan. 30, 2001

(54) LASER MARKING OF FOLIAGE AND CIGARS

(75) Inventors: Ronald Scott Jones, Pierson; William Earl Vaughn, Ormond Beach; Roy Harrell, Gainesville, all of FL (US)

(73) Assignee: Advanced Foliar Technologies, Inc., Pierson, FL (US)

( * ) Notice: Under 35 U.S.C. 154(b), the term of this patent shall be extended for 0 days.

(21) Appl. No.: 09/251,778

(22) Filed: Feb. 17, 1999

Related U.S. Application Data

(63) Continuation-in-part of application No. 09/105,665, filed on Jun. 26, 1998.
(60) Provisional application No. 60/074,861, filed on Feb. 17, 1998.

(51) Int. Cl.[7] .......................... B23K 26/00; B23K 26/38; A24D 1/00
(52) U.S. Cl. ............... 219/121.68; 131/360; 219/121.69
(58) Field of Search ......................... 219/121.68, 121.69, 219/121.82; 131/281, 284, 299, 360, 368

(56) References Cited

U.S. PATENT DOCUMENTS

| | | |
|---|---|---|
| 4,001,840 * | 1/1977 | Becker et al. ................... 219/121.68 |
| 4,141,456 * | 2/1979 | Hart ................................ 219/121.68 |
| 4,374,314 * | 2/1983 | Deacutis ......................... 219/121.69 |
| 4,486,645 | 12/1984 | Jedlicka et al. . |
| 4,636,043 | 1/1987 | Bellar . |
| 4,699,829 | 10/1987 | Willinger . |
| 4,791,267 | 12/1988 | Yokoyama et al. . |
| 4,912,298 * | 3/1990 | Daniels et al. .................. 219/121.69 |
| 4,997,994 * | 3/1991 | Andrews et al. ............... 219/121.69 |
| 5,021,631 | 6/1991 | Ravellat . |
| 5,120,928 | 6/1992 | Piliero . |
| 5,198,843 | 3/1993 | Ito et al. . |
| 5,480,308 | 1/1996 | Boundy et al. . |
| 5,660,747 | 8/1997 | Drouillard et al. . |
| 5,821,497 * | 10/1998 | Yamazaki et al. ............. 219/121.69 |
| 5,906,760 * | 5/1999 | Robb et al. ..................... 219/121.67 |

FOREIGN PATENT DOCUMENTS

| | | |
|---|---|---|
| 3836821 | 5/1990 | (DE) . |
| 2654662 | 5/1991 | (FR) . |
| 2202723 * | 10/1998 | (GB) . |
| 62-266251 | 7/1989 | (JP) . |
| 9-9783 * | 1/1997 | (JP) . |
| 7703277 * | 2/1978 | (NL) . |
| 8900357 * | 9/1990 | (NL) . |

OTHER PUBLICATIONS

Advertisement Media for Lumonics' Lazermark 960, no publication date.

* cited by examiner

*Primary Examiner*—Geoffrey S. Evans
(74) *Attorney, Agent, or Firm*—Saliwanchik, Lloyd & Saliwanchik

(57) ABSTRACT

A method and system are provided for etching, cutting and/or altering the surface of a flower, plant, cut foliage, or foliage incorporated into consumable products such as cigars with laser energy to affect a desired artistic or utilitarian design or marking on the foliage/cigar. The invention includes the products produced by such method.

25 Claims, 12 Drawing Sheets

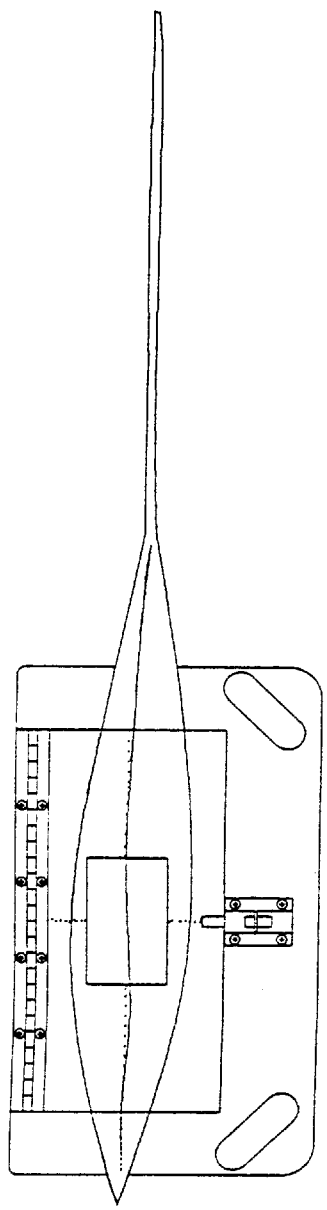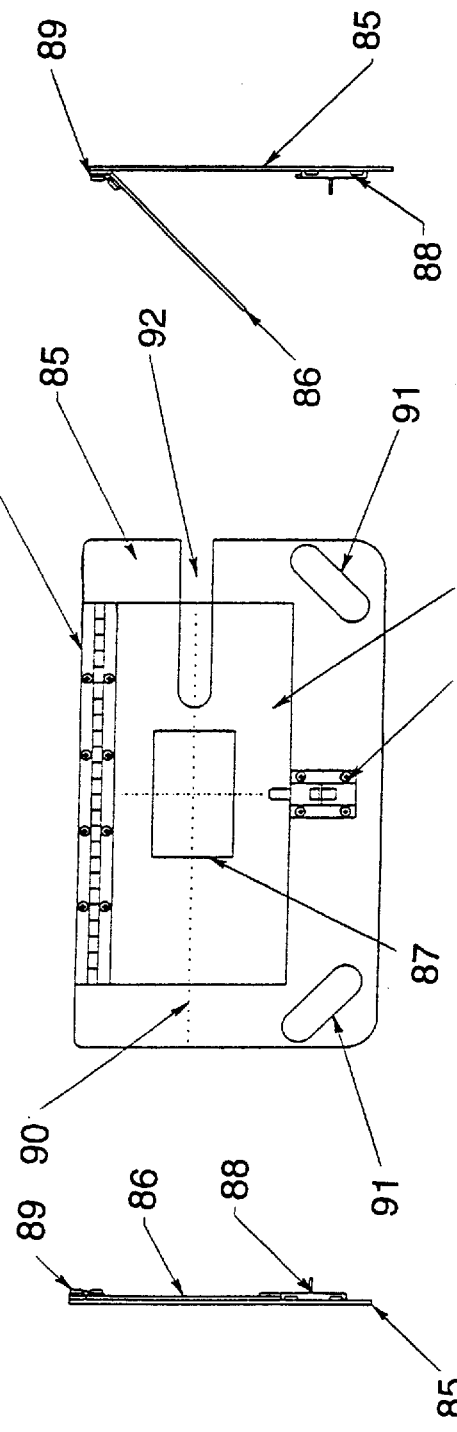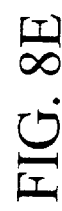

LASER MARKING OF FOLIAGE AND CIGARS

CROSS-REFERENCE TO RELATED APPLICATION

This application is a continuation-in-part of co-pending U.S. application Ser. No. 09/105,665 filed Jun. 26, 1998, pending, which claims the benefit of U.S. Provisional Application No. 60/074,861, filed Feb. 17, 1998.

FIELD OF THE INVENTION

The present invention relates to a method and apparatus for affecting a design on a leaf or leaf wrapped product (e.g., cigars, cigarillos, cigarettes) and the end product resulting therefrom. The method and apparatus for affecting a design on a leaf or leaf wrapped product employs laser energy to etch the surface of the product or cutting through the product to produce an ornamental design and/or to represent text to form a unique environmentally friendly end product which conveys a message, greeting, expression, identification, information, communication, inscription, design, artwork, digital image, or the like, directly on the end product.

BACKGROUND OF THE INVENTION

Many industries have a need for marking items. Such marking may include coding for inventory control, labeling, instructions and/or identification. Floral industries have the same need to mark potted and cut plants and flowers. Floral industries have a further need to include various greetings when delivering plants and flowers for special occasions. The floral industry currently utilizes standard marking practices on the containers or pots such as direct inking or adhesive labels. Plant inserts are also often provided for pricing, inventory control, growing directions. With respect to floral arrangements, usually a small card is included when the arrangement is delivered attached to a plastic holder inserted into the vase or container. The card usually includes a greeting, such as "Happy Birthday."

Cigars are also often given as greetings and for congratulations, birth announcements and the like. Cigars used for this purpose typically have a special greeting printed on the band or on a plastic/paper wrapper with the cigar inside.

Some industries, albeit not the floral industry, have begun using laser energy to mark items. Such methods are provided by: Ravellat (U.S. Pat. No. 5,021,631), Piliero (U.S. Pat. No. 5,120,928), Ito et al. (U.S. Pat. No. 5,198,843), and Drouillard et al. (U.S. Pat. No. 5,660,747). While these devices use laser energy to mark items, they typically are used to mark nonsensitive nonliving items with simple bar codes or alphanumeric characters. The items marked are not flexible or delicate, and, therefore, concerns in being able to adequately mark products in the floral industry using a laser are not addressed by such patents. Similarly, such patents do not address the concerns for marking leaf wrapped products such as cigars, including its cylindrical form factor.

There remains a need for a method to mark/cut thin, flexible and delicate materials without destroying the item itself.

BRIEF SUMMARY OF THE INVENTION

The present invention includes a method of affecting a design on a leaf or leaf wrapped product with laser energy by cutting and/or marking and the end product resulting therefrom. Implementation of this method is by placing the foliage/cigar in the path of the laser energy to create the design, affecting relative motion between the laser beam and foliage/cigar, and modulating the intensity of the laser energy. Alternatively, the process can be accomplished by inserting an opaque metal stencil (preferably copper) machined with the desired design and focusing optics between a stationary laser beam and foliage/cigar. This method burns the design into the foliage/cigar with a short time duration burst of laser energy.

Accordingly, it is an object of the present invention to provide a method for transferring leaves into the marking/cutting field of the laser source wherein the leaf is held stationery with a clamping fixture and/or vacuum during the laser processing. Additionally, the conveyance system incorporates a method to allow laser energy, after passing through the leaf, to be dissipated on the aluminum plate used to support the leaf without damaging the conveyor belt. Further, the conveyance system incorporates sensing to detect the presence or absence of leaves in the marking/cuttingzone. Moreover, this method provides for the inclusion of pre-laser processing operations and/or post-laser processing operations on the foliage to improve contrast or other product enhancements not achievable exclusively with laser marking/cutting. These processes could include forced air drying and the application of surface chemicals, thermally sensitive pigments, and preservative agents.

It is another object of the invention to provide a method for automatically transferring leaves stacked in a container onto the conveyor. This method incorporates techniques for identifying when all leaves have been removed from the carton.

Another object of the invention to provide a method for interacting with the machine operator through menu driven screens on an operator interface panel and through a visual and audible beacon.

It is a further object of the invention to provide a method for efficiently encoding foliage designs created in off the shelf graphic design packages. The encoded foliage designs (design profiles) can be incorporated into a design database that allows an operator to select a specific design through the operator interface panel.

A further object of the present invention is to provide a method for providing designers of laser altered foliage with the hardware and software tools needed to develop new product designs and translate these designs into efficient formats for use by production equipment.

A further object of the present invention is to provide a method for quality control via machine vision inspection of the leaf prior to and after laser processing. This method can accurately determine the position and orientation of a leaf in the marking/cutting field and adjust design profile to optimize placement of the design onto the leaf. This method can also provide feedback to the operator for quality control purposes and be used to adjust laser power to improve product quality.

A further object is to provide a method for improving the productivity of a manually loaded system by means of a dual station, dual position foliage shuttle. This method provides an operator with the capability to unload a leaf from or load a leaf into a clamp fixture located outside of the laser field of view thus allowing the concurrent processing of a leaf previously loaded into the alternate clamp fixture.

Another object is to provide a method which gives operators the exact location where a design will be marked and/or cut onto a leaf during the leaf loading process. This method improves the uniformity of the end product and improves throughput of the system by allowing fast, accurate loading of leaves. This method utilizes a clear, polycarbonate template onto which a design has been etched. The design template is positioned over the leaf clamp during manual loading and is automatically displaced out of the laser field of view during processing.

A further object of the invention is to provide an automated system for marking cigars by utilizing a conveyor with the cigar in a VEE notch as well as full circumferential marking of cigars.

BRIEF DESCRIPTION OF THE DRAWINGS

FIGS. 8A–E is a detailed view of the leaf clamp of the present invention.

DETAILED DISCLOSURE OF THE INVENTION

Figure 1:
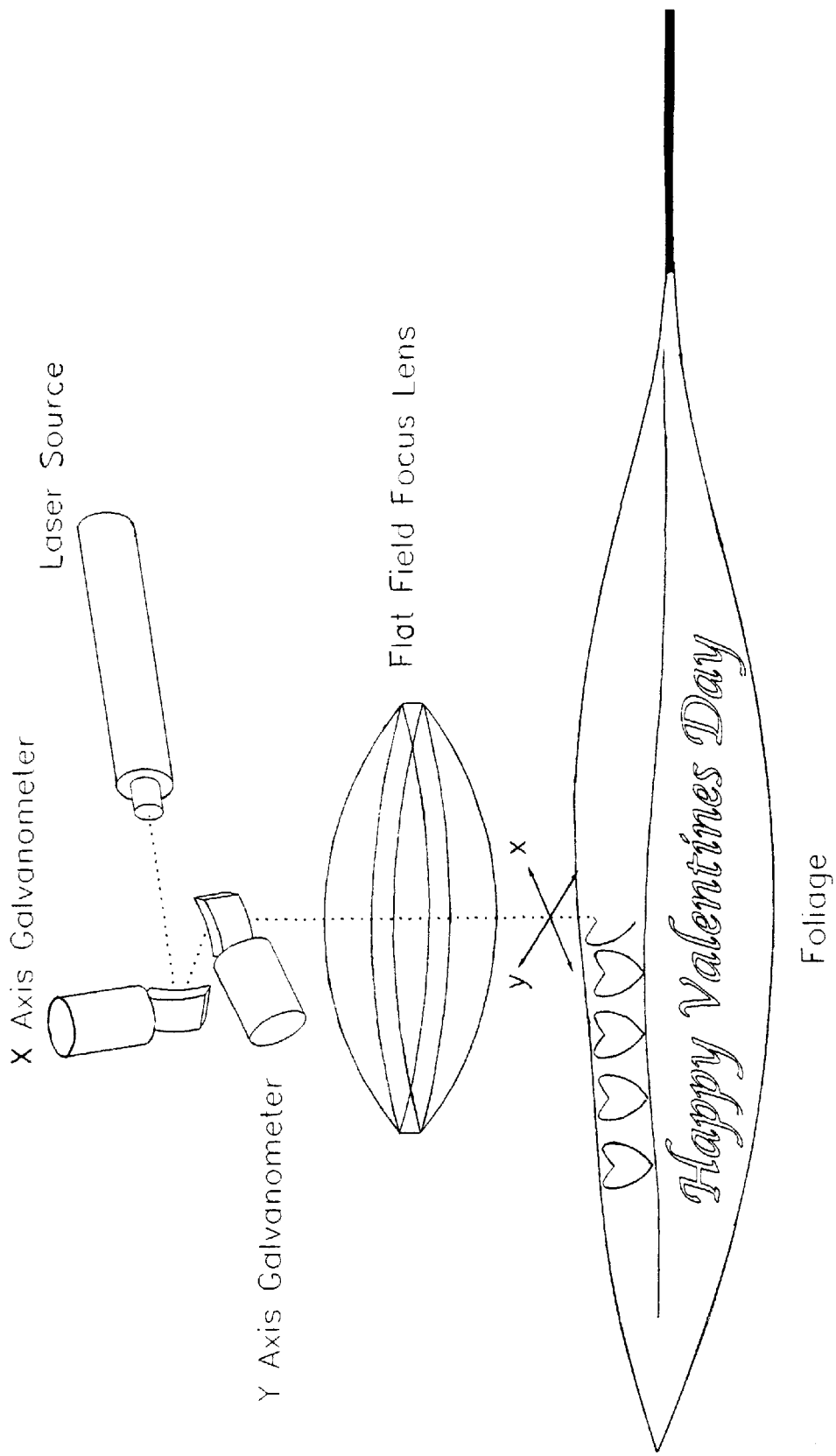
FIG. 1 is a diagram of the marking process of the present invention utilizing a galvanometer.

The present invention is designed to provide a unique method for marking on various types of leaves and flower petals as well as certain products made from leaves, such as cigars (tobacco leaves) to provide an end product which may be used ornamentally or for identification purposes. The method includes etching the surface of the product or cutting through the product to produce an ornamental design and/or to represent text to form a unique environmentally friendly end product which conveys a message, greeting, expression, identification, information, communication, inscription, advertisement, bar code, inventory marking price information, business message or card, or the like directly on the end product. The leaves, for example, may be used in floral arrangements or potted plant arrangements, to convey a greeting such as "Happy Valentines Day," or may be used for inventory control with bar codes or product identification numbering. Cigars may also be marked with greetings, information, identification or the like in basically the same manner.

Because of the unique structure of a leaf, certain problems had to be overcome to be able to adequately produce a marked product without destroying the leaf, in the case of marking on live plant material, and without burning through to the tobacco when marking a cigar. The cylindrical form and/or torpedo form of the cigars also created concerns for uniform marking and full circumferential marking. Cigars also have a lower moisture content than live or fresh cut leaves, therefore concerns arose for power settings of the laser. Concerns regarding affecting the ability of the leaf to photosynthesize and respire (breathe) also had to be addressed. Unlike certain other materials which are rigid and have certain defined thickness allowing for a larger margin of error, the flexibility of leaf material and the delicateness of leaves and flower petals (corolla) also raised concerns in being able to adequately mark such products using a laser.

Leaves come in a variety of shapes and sizes, ranging from broad fronds to tiny scales. Some of these differences can be correlated with the environments in which the plants live. The exterior structure of a leaf generally includes the midrib with veins extending therefrom, the body of the leaf (which is also referred to as the blade), and the edge, or margin of the leaf. Some of the various leaf margins include entire, dentate, doubly dentate, crenate, lobate and ciliate. Each of these margins represent a different shape to be dealt with when marking the leaf. Leaves, themselves, also are of various types (shapes), such as linear, lanceolate, ovate, orbiculate, spatulate, peltate, hastate, reniform and cordate for simple leaf structures, and pinnatifid, odd pinnate, abruptly pinnate, trifoliate, and palmate for compound leaf structures.

The cross section of a leaf generally includes the following layers from the top to the underside: cuticle, upper epidermis, palisade parenchyma and spongy parenchyma (through which the vein runs) both of which make up the mesophyll, lower epidermis, and cuticle. Photosynthesis takes place in the palisade cells and, to a lesser extent, in the spongy parenchyma. The interior of the leaf is entirely enclosed by epidermal cells covered with a waxy layer, the cuticle. The stomata, openings in the epidermis, permit the exchange of gasses. Stomata are commonly most abundant on the undersurface of leaves and may be very numerous. For example, on the lower surface of tobacco leaves, there are about 19,000 stomata per square centimeter whereas on the upper surface there are about 5,000 stomata per square centimeter. Therefore, damage to the undersurface should be avoided.

The preferred implement for marking the plant material is a laser or any of several devices that convert incident electromagnetic radiation of mixed frequencies to one or more discrete frequencies of highly amplified and coherent ultraviolet, visible, or infrared radiation or any device whose output is in a visible or invisible region of the electromagnetic spectrum. The device is designed to etch or cut into the surface of the leaf or petal to mark the plant material with an ornamental design, identification, or the like. The device can be modified to cut through or penetrate the plant material to form a cut-out shape in lieu of or in addition to the etching. Stencils may be used to implement the appropriate shape or design.

The following is a description of the preferred embodiments for accomplishing laser marking and/or cutting of foliage. Throughout the following description, the use of the terms leaf, foliage, cigar and leaf wrapped product are intended to be used interchangeably, unless otherwise noted.

Three embodiments for accomplishing the method of the present invention may be summarized as follows:

The first method includes angular, beam-steered, laser marking and cutting. In this method, a marking image and/or cutting pattern is accomplished with two beam-steering mirrors mounted on high speed galvanometers that direct the laser energy across the target surface. Each galvanometer provides one axis of beam motion in the marking field. The beam projects through a multi-element, flat field lens assembly after reflecting off the final steering mirror. The lens assembly focuses the laser energy to achieve the highest power density on the work surface while maintaining the focused spot travel on a flat plane. The area on the work surface in which the laser can effectively mark or cut is referred to as the laser field, laser field of view, or the mark/cut field of view.

The laser can be regulated to different intensities and/or translation speeds during the marking/cutting process to achieve different levels of contrast within a particular design or, during the cutting process, to facilitate cutting through foliage tissues of different densities. The later situation arises when cutting leaf tissue and stem tissue with stem tissue requiring significantly more energy to cut. Leaf tissue is discolored when exposed to focused laser energy through thermal disruption of the cuticle, upper epidermal cellular layer, mesophyllic layer, and lower epidermal cellular layer. The degree of contrast between the undisturbed leaf tissue (darker in color) and the affected tissue (lighter in color) can be controlled by varying the speed and effective power density of the laser. In general, the more energy absorbed by the leaf results in a higher contrast up to the level at which the mesophyllic layer is sufficiently disrupted to expose the underside epidermal layer at which point the contrast between the undisturbed leaf surface and laser processed area is reduced. However, this phenomena can be utilized to create a transparent effect when the leaf is predominantly back light since light is more readily transmitted through the processed area than through the undisturbed portion of the leaf. The intensities of the laser may also be adjusted to achieve different levels of contrast or when dealing with foliage of different densities.

This method offers the user the advantage of implementing a computer generated marking and/or cutting image. The galvanometer/mirror/lens assembly is commonly referred to as a marking head. A diagram of this process is shown in FIG. 1.

The second method includes Cartesian laser marking and cutting. In this method, a marking image and/or cutting pattern is accomplished by a) moving the laser beam in a Cartesian fashion over the targeted foliage or b) moving the targeted foliage in a Cartesian fashion underneath a stationary laser energy source. Relative laser/foliage motion is accomplished through computer controlled, servo or stepper motor actuated linear axes, affecting motion along two independent perpendicular axes in a plane normal to the laser beam. Focusing lenses are employed in this process to achieve a high power density on the work surface. However a flat field lens assembly is not required in this embodiment due to the permanent normalcy of laser beam and marking plane.

As with the first method, the laser can be regulated to different intensities and/or translation speeds during the marking/cutting process to achieve different levels of contrast within a particular design or, during the cutting process, to facilitate cutting through foliage tissues of different densities. The later situation arises when cutting leaf tissue and stem tissue with stem tissue requiring significantly more energy to cut. As with the first method, the relative laser/foliage motion is accomplished via computer control to generate the desired design on the foliage.

Figure 2:
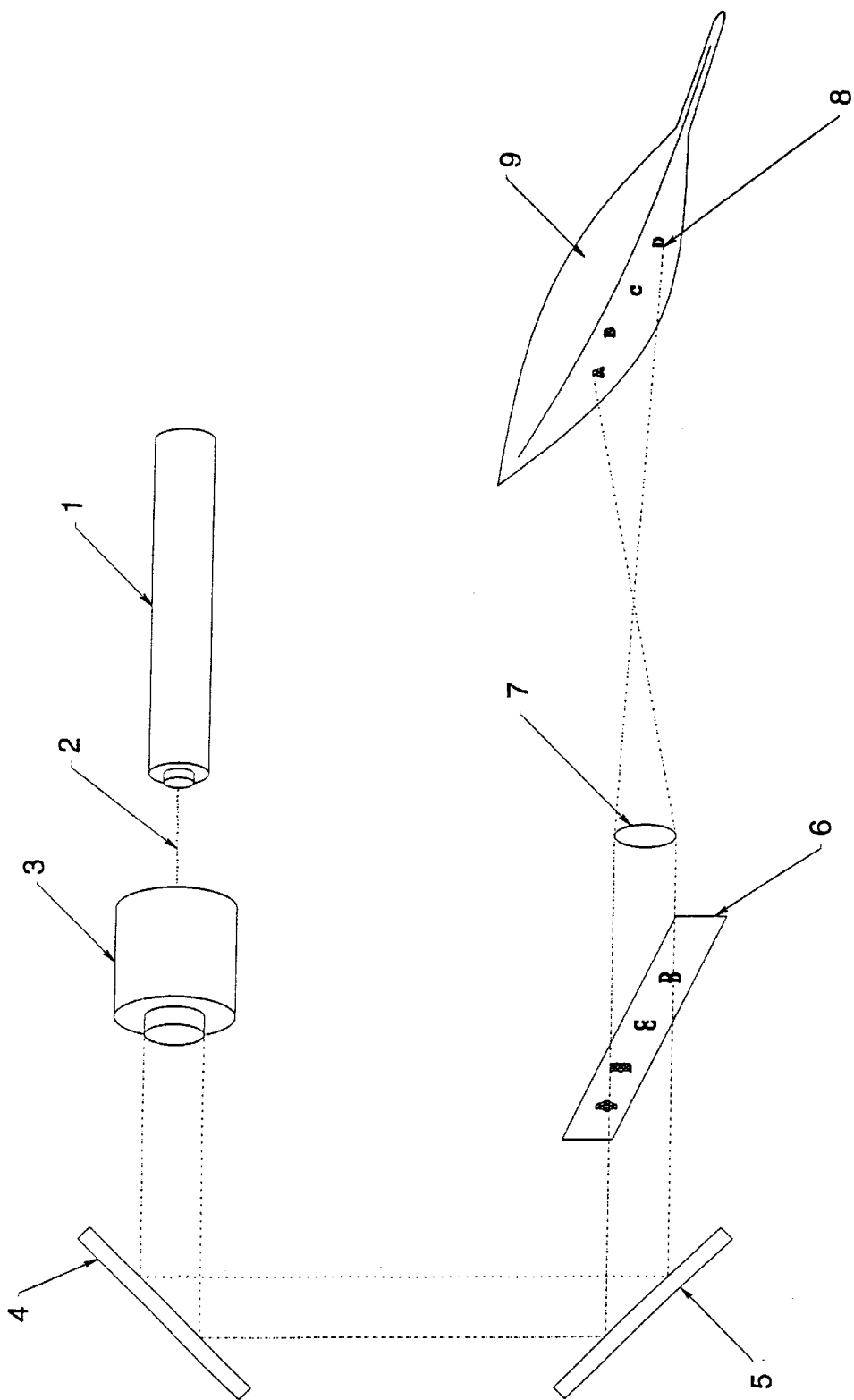
FIG. 2 is a diagram of a stencil marking system of the present invention.

The third method includes stencil laser marking and cutting. This approach may sacrifice the flexibility and image quality achievable with the first and second methods for significantly increased marking speed. A diagram of a stencil marking system is shown in FIG. 2. The marking image is created by enlarging the beam 2 from a $CO_2$ laser 1 with a beam enlarging lens 3. The enlarged beam can be directed with turning mirrors 4 and 5 if required, projected through a copper stencil 6 containing the desired image to be marked, and re-focused with the lens 7 onto the leaf 8 to generate the image 9. A single pulse of laser energy creates the entire image. Different mark designs can be achieved by inserting a different stencil into the system. This method, while much faster than either the galvanometer or Cartesian approaches, requires a much higher power laser and creates a "stencil" appearance of the design on the leaf with breaks in the marking lines. Marking or cutting designs can be changed by inserting a different stencil into the system.

The availability of relatively low cost, two axis high speed galvanometer marking heads make the first method a cost effective approach. A typical system, imbedding the galvanometer marking head approach and suitable for production volume laser marking and cutting of foliage and incorporating automated material handling is configured as shown in Table 1 as follows:

TABLE 1

Laser Marking/Cutting Systems Components

| Component | Name | Description/Specification |
|---|---|---|
| 20 | Laser Processing Station | Automated load/unload system with machine vision quality control. |
| 21 | Laser | 50W sealed $CO_2$ laser, water cooled |
| 22 | Power Supply | 30 VDC Power Supply, internal to control cabinet |
| 23 | Flat Field Lens Assembly | Imbedded into marking head |
| 24 | Marking Head | 2 axis, galvanometer actuated marking head |
| 25 | Controller | Generates signals for marking head galvanometers and laser intensity to produce desired design |
| 26 | Cooling System | 1.8 GPM chilled water cooling system |
| 27 | Fume Extractor | Cannister vacuum fume extracting system |
| 28 | Support/Safety | Support structure and safety enclosure for laser. Establishes the extent of the nominal hazard zone. |
| 29 | Leaf/Cigar Clamp | Secures cigar or holds leaf surface relatively flat during the marking/cutting process |
| 30 | Leaf/Cigar Sensor | Detects that a leaf or cigar is present on the conveyor just upstream from the marking zone |
| 31 | Leaf/Cigar Conveyor | Flighted belt conveyor for transport of cigars/leafs into and out of the mark zone. Flights are VEE shaped for cigar processing and have wider, flat bottoms for leaf processing. |
| 32 | Operator Interface | Touch screen display. Used to setup machine functions. |
| 33 | Beacon | Provides visual and audible signals for operational and fault status of system |
| 34 | Pick and Place Unit | Retrieves an individual stem or cigar from carton and places on conveyor |
| 35 | Vacuum Cup | Attached to pick and place "Z" axis for picking up individual stem or cigar |
| 36 | Horizontal Axis | Horizontal or "X" actuator for stem or cigar pick and place unit |
| 37 | Vertical Axis | Vertical or "Z"actuator for stem or cigar pick and place unit |
| 38 | Box Stand | Holds carton of unprocessed stems or cigars |
| 39 | Box Stand | Holds carton of processed stems or cigars |
| 40 | Emergency Stop | Terminates laser, conveyor, and actuator energy sources |

TABLE 1-continued

Laser Marking/Cutting Systems Components

| Component | Name | Description/Specification |
|---|---|---|
| 41 | Machine Vision | Used for pre laser and post laser inspection of leaf or cigar |
| 42 | Drying Tunnel | Removes surface moisture from foliage or cigar prior to laser processing |

A similar system incorporating a dual position, manual load foliage shuttle in lieu of automated material handling capability is shown in Table 2 with details of the foliage shuttle shown in Table 3.

TABLE 2

Manual Load/Unload Laser Marking/Cutting Systems Components

| Component | Name | Description/Specification |
|---|---|---|
| 50 | Foliage Shuttle Assembly | Translates foliage into and out of laser mark/cut field. |
| 51 | Laser Support Structure | Supports and encloses laser and marking head. |
| 52 | Laser | $CO_2$ laser for marking and cutting foliage |
| 53 | Mark Head | Provides for directional control and focusing of laser. |
| 54 (Left) 55 (Right) | Foliage Clamp/Template Shutter Assembly | Secures foliage for marking and provides operator with alignment guides during loading. |
| 56 | Push Button Station | Provides basic system cycle control for operator |
| 57 | Control Computer | Controls laser power, mark head, and shuttle motion. |
| 58 | Operator | Loads and unloads foliage. Supervises operation of system. |
| 59 | Shuttle Base | Sliding base for foliage clamps and design template assemblies |

TABLE 3

Foliage Shuttle

| Component | Name | Description/Specification |
|---|---|---|
| 50 | Foliage Shuttle | Pneumatically activated with dual linear sides. |
| 59 | Shuttle Base | Supported by dual linear slides. Translates foliage clamps in to and out of laser mark/cut field |
| 60 | Shutter Stops | Fixed tabs that engage with design template. Forces design template out of laser field during processing. |
| 61 | Foliage Clamp | Pneumatically actuated clamp fixture. |
| 62 | Shutter Tacks | Slots cut into shuttle base in which the design template cam slides. |
| 54 (Left) 55 (Right) | Clamp Frame | Clamp Frame adjustable to accommodate range of foliage size and shape. Compliant surface to prevent damage to foliage. |
| 63 (left) 64 (right) | Design Template Shutter | Clear polycarbonate onto which a foliage design is etched. Position of design corresponds to laser mark/cut field when foliage is in mark/cut field. |
| 65 | Design Template Cam | Engages with shutter stop when clamp fixture is in laser mark/cut zone. Forces design shutter out of laser mark/cut field |
| 66 | Shuttle Base Stops | End stops to fix position of shuttle and clamps for foliage processing. |

In all three methods pre-laser and post-laser processing may be used to ensure the best results in the laser etching of the foliage and a longer shelf life. The pre-laser process of the leaves consists of thoroughly cleaning and drying the surface to be marked/cut. The post laser processing protocol consisting of storage in a high humidity, 45° F. to 55° F. environment helps extend the shelf life of the processed leaf.

The following will describe the laser components common to each approach, the details of the automated material handling components, and the details of the manual load process and equipment. Identifications of the components are itemized in Tables 1, 2, and 3, respectively.

We now turn to the laser components. The leaf-laser dynamic varies from leaf to leaf and is dependent on a host of factors including species, variety, leaf moisture content, leaf maturity, leaf color, and surface moisture. However, consistent, predictable results can be achieved when power density and speed settings (marking protocol) have been established for a desired effect on a particular leaf type and provided that subsequent leaves to be marked have characteristics (e.g. color, maturity, moisture content) sufficiently similar to those leaves used to establish the marking protocol. For example, when marking a mature, surface dry, dark green Aspidistra leaf the following protocol results in a satisfactory contrast between processed areas and unprocessed areas of the leaf:

Laser Wave Length: 10.6 $\mu$m ($CO_2$ Laser)
Laser Power: 2.5 w
Laser Speed: 30 in/s
Laser Spot Size at Leaf Surface: 0.005 in
Laser Pulse Rate: 500 pulse/in Various levels of contrast in this leaf type can be achieved by varying the power from 0.5 w to 10 w during the marking process with the lower power levels resulting in lower contrast between processed and unprocessed leaf areas. This response can be used to achieve gray level processing of the leaf and is advantageous when implementing designs such as photographs.

To expose the lower epidermal layer, resulting in a transparent effect, the following protocol for the same leaf type can be used:

Laser Wave Length: 10.6 $\mu$m ($CO_2$ Laser)
Laser Power: 25 w
Laser Speed: 15 in/s
Laser Spot Size at Leaf Surface: 0.005 in
Laser Pulse Rate: 500 pulse/in To cut in the stem tissue region of the leaf, laser speed should be reduced to 2.5 in/s.

Throughput for such a system is dependent on the design being implemented on the leaf. Laser process times will typically vary from 5 s to several minutes depending on the complexity of the design, type of motion control system used, and if cutting is employed.

Figure 3:
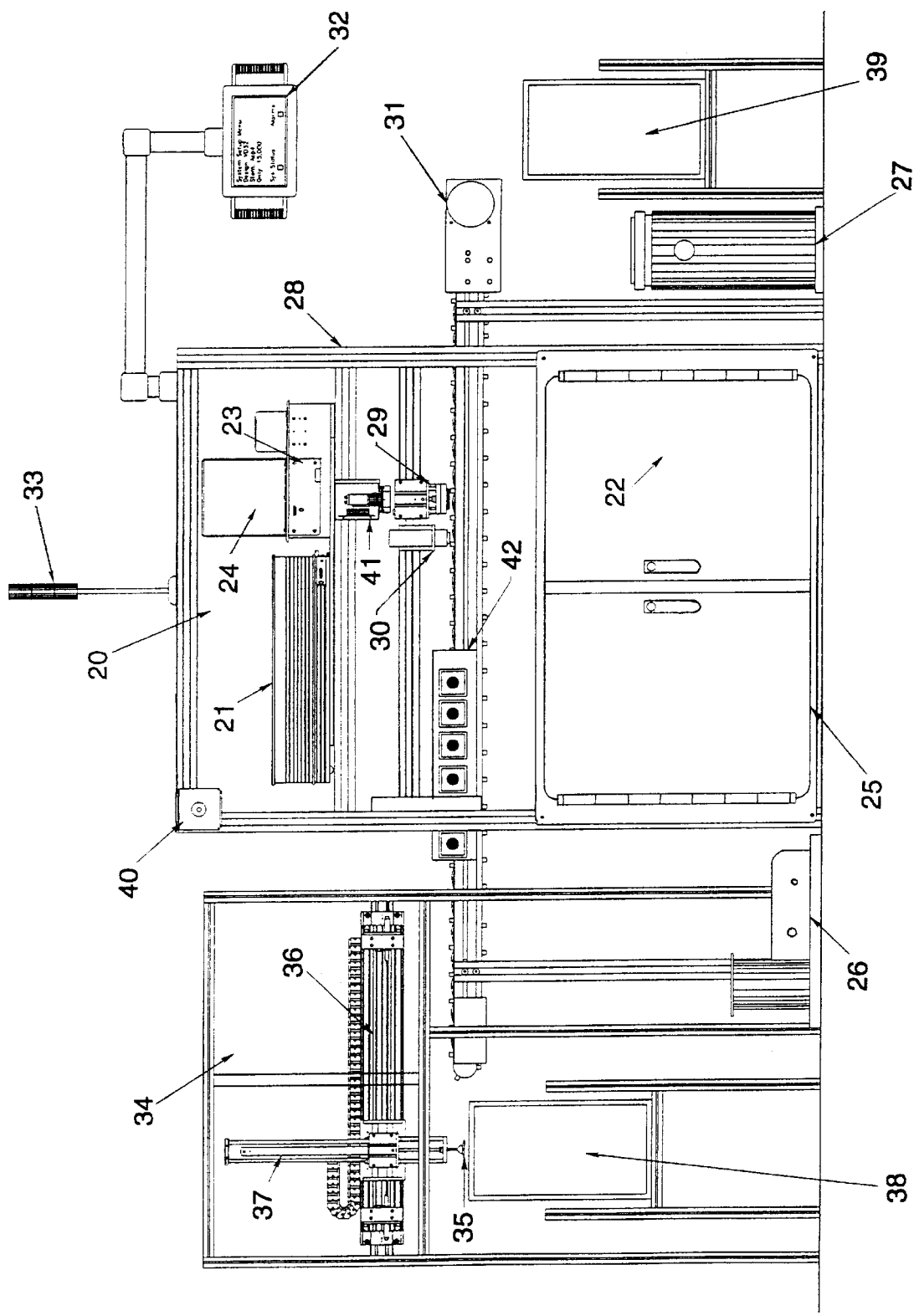
FIG. 3 is a side view of the laser station of the present invention.

The elements of table 1 are described herein in more detail with reference to FIG. 3. The laser station 20 is a sub assembly that includes all components required to mark and cut foliage with laser. This sub assembly incorporates a 50 W, power controlled laser with beam directional control accomplished through a two axis, high speed, galvanometer based marking head. The free standing support and safety structure is constructed from extruded aluminum and polycarbonate panels.

The laser 21 is preferably a 25 W, air cooled $CO_2$ laser with wavelengths of 10.57 $\mu$m to 10.63 $\mu$m. Other power lasers and cooling devices may be employed.

The power supply 22 is preferably a 30 VDC, 32A AC to DC power supply.

The lens assembly 23 preferably includes flat field lens assemblies incorporated into the marking head. These can be interchanged with different lenses to achieve various marking/cutting fields of view.

The marking head 24 is used to steer the laser beam to produce a desired marking/cutting design. It is preferably a dual axis, high speed galvanometer type, electronically controlled through a fiber optic link for marking the head controller card installed in the control computer, and has full amplitude drive frequencies up to 130 HZ.

The system controller 25 is preferably a personal computer based controller that provides drive signals to the marking head, power control signals to the laser, and monitors system status. It includes the hardware interface and software drivers for the marking head and laser power control. It generates marking head and laser power control signals as required to implement a design as specified in a design profile. It also controls the conveyor, pick and place unit, and foliage or leaf clamp. The operator interacts with the controller through the operator interface panel.

If water cooling is utilized, the cooling system 26 is preferably a chilled water cooling system to maintain optimum internal laser temperature during operation, 1.8 GPM, 1 KW.

The exhaust fan 27 is used to exhaust noxious fumes and smoke to the outside environment when marking or cutting certain products.

The support and enclosure 28 is preferably a free standing support and safety structure used to support the laser, marking head, leaf clamp, leaf sensor, operator interface, and beacon. The structure is constructed from extruded aluminum profiles and enclosed with polycarbonate panels. A safety switch interlocked access door provides access to the system for servicing. This structure establishes the extent of the laser Nominal Hazard Zone (NHZ).

We now turn to the automatic material handling embodiment. The components of this embodiment as described below provide for the automatic load and unload of foliage and are suitable to automatically mark and cut a wide variety of foliage as shown in Table 1. It includes automated material handling and system controls. Further, it includes means for operator interaction through a touch screen operator interface panel and a light/sound beacon. Moreover, the process line can be easily expanded to incorporate either pre-laser processing and/or post-laser processing of the foliage to improve contrast or other product enhancements not achievable exclusively with laser marking/cutting. These processes could include forced air drying and the application of surface chemicals, thermally sensitive pigments, and preservative agents.

The system components can be sized to accommodate a practical range of product sizes and shapes. For instance, a system to process cigars (or other leaf wrapped products) would use smaller unprocessed cartons, processed cartons, and narrower conveyor width and inter-flight space than would a system designed to process large leaves. Additionally, the lens assembly can be selected to produce the marking/cutting field and laser spot size appropriate for the design profile being implemented. Further, a system can be setup only for foliage marking in which case a lower powered laser (10 W) could be employed.

The leaf clamp 29 is preferably a pneumatic fixture used to secure and flatten foliage during the marking/cutting process. It is activated with a solenoid valve actuated by the controller, and is air pressure regulated to prevent damage to foliage during clamping. It incorporates compliant foam on foliage matting surface to minimize pressure on the foliage. Different style and size clamps can be interchanged to accommodate different products.

Alternatively, when the conveyor belt includes apertures in the inter-flight spaces, a vacuum could be applied through the honey-comb support plate located underneath the conveyor belt in the laser mark/cut field. This vacuum would hold and flatten the leaf onto the honeycomb structure, assisting the leaf clamp or precluding the need for a leaf clamp.

The leaf sensor 30 is preferably an optical reflective sensor to detect the presence of foliage in the inter-flight space on the conveyor belt immediately upstream from the marking/cutting zone. It is monitored by the controller to determine if the foliage is present for processing.

The leaf conveyor 31 is preferably a flat belt, flighted conveyor with space between flights appropriate for the size of foliage being processed. In cutting applications, the belt incorporates apertures in all inner-flight spaces which are aligned with the cutting field. A stationary, replaceable, aluminum honeycomb plate is placed directly underneath the cutting zone to provide foliage support during clamping and to allow for beam divergence after passing through foliage. The conveyor is driven with a variable speed electric motor controlled by the system controller.

The operator interface 32 is preferably a flat screen, touch panel display unit used by the operator to monitor system operation and select system operation modes. A product selection screen allows operators to establish the product to be processed, design profiles to be implemented, and quantity of product to be produced. Various monitor screens display system status including number of leaves processed, cycle times, total operational time on laser, and overall system status. Alarm screens display current fault (if one exists) and fault history.

The beacon 33 preferably provides multiple audible and visual signals related to system status. For example, a green beacon indicates nominal system operation, a blue beacon indicates an empty unprocessed foliage carton or a full processed foliage carton, a flashing blue beacon indicates the system has completed the pre-programmed production run, and a red beacon and corresponding audible alarm indicates a system fault.

The pick and place unit 34 is preferably a subassembly that retrieves an individual, unprocessed leaf from the unprocessed foliage carton and places the leaf onto the infeed section of the leaf conveyor in between conveyor flights. This structure is constructed from extruded aluminum profiles and enclosed with polycarbonate panels.

The vacuum cup pickup 35 is preferably used to secure an individual leaf to the pick and place vertical axis. The conical vacuum cup is manufactured from a pliant material such as butyl and is attached to the vertical axis with a spring loaded buffer. The vacuum level is monitored by the system controller to determine if and when a leaf has been secured to the vertical axis.

The horizontal axis 36 is preferably a pneumatic, stepper motor, or servo motor driven linear axis used for the horizontal transfer of a leaf from the unprocessed carton to the infeed section of the leaf conveyor. Motion will typically be point to point and controlled by the system controller.

The vertical axis 37 is preferably a timing belt drive linear axis actuated by either a servo motor or stepper motor. Downward motion is monitored by the system controller until, for example, a) an acceptable level of vacuum has been achieved at the vacuum cup pickup head or b) the vacuum head has engaged the bottom of the unprocessed foliage carton before an acceptable level of vacuum has been achieved.

In case 'a' the motion is reversed, separating the leaf from the leaf stack in the unprocessed carton and clearing the top of the carton. At which time the horizontal axis moves the vertical axis subassembly with the leaf to the appropriate drop position above the leaf conveyor. The vertical axis is then moved downward until the leaf has made contact with the conveyor belt at which time the vacuum is reversed disengaging the leaf from the vacuum pickup head. The vertical axis is moved upward, the horizontal axis moved back over the unprocessed carton and the process repeated until all leaves have been retrieved from the carton or until the current production run has been completed.

In case 'b' the system controller discontinues the vacuum, moves the vertical axis up to a home position, placing the pickup head above the unprocessed leaf carton, and signals through the operator interface and beacon that additional unprocessed material is required.

The unprocessed carton 38 preferably holds foliage to be processed. Dimensions are established by the particular product type. This carton is supported by a stand onto which material handling personnel can easily place and remove cartons.

The processed carton 39 preferably holds foliage after processing. Dimensions are established by the particular product type. Processed leaves fall off the end of the leaf conveyor into this carton. This carton is supported by a stand onto which material handling personnel can easily place and remove cartons. The processed carton support stand includes a photo switch that detects when a carton has been filled with processed leaves.

The emergency stop 40 is preferably an emergency stop push button which terminates all power to laser, conveyor, and pick and place actuators when depressed.

The Machine vision 41 is preferably a machine vision inspection system with a field of view corresponding to the approximate marking/cutting field. It is used to determine the precise position and orientation of a leaf on the conveyor in the marking/cutting field. Data obtained from machine vision are used to a) adjust the design profile prior to processing an individual leaf to optimize the placement of the design on the leaf, b) provide quality control information that can be utilized to adjust laser power on subsequent leaves if appropriate and to warn the operator of a faulty leaf or system operation.

Figure 4A:
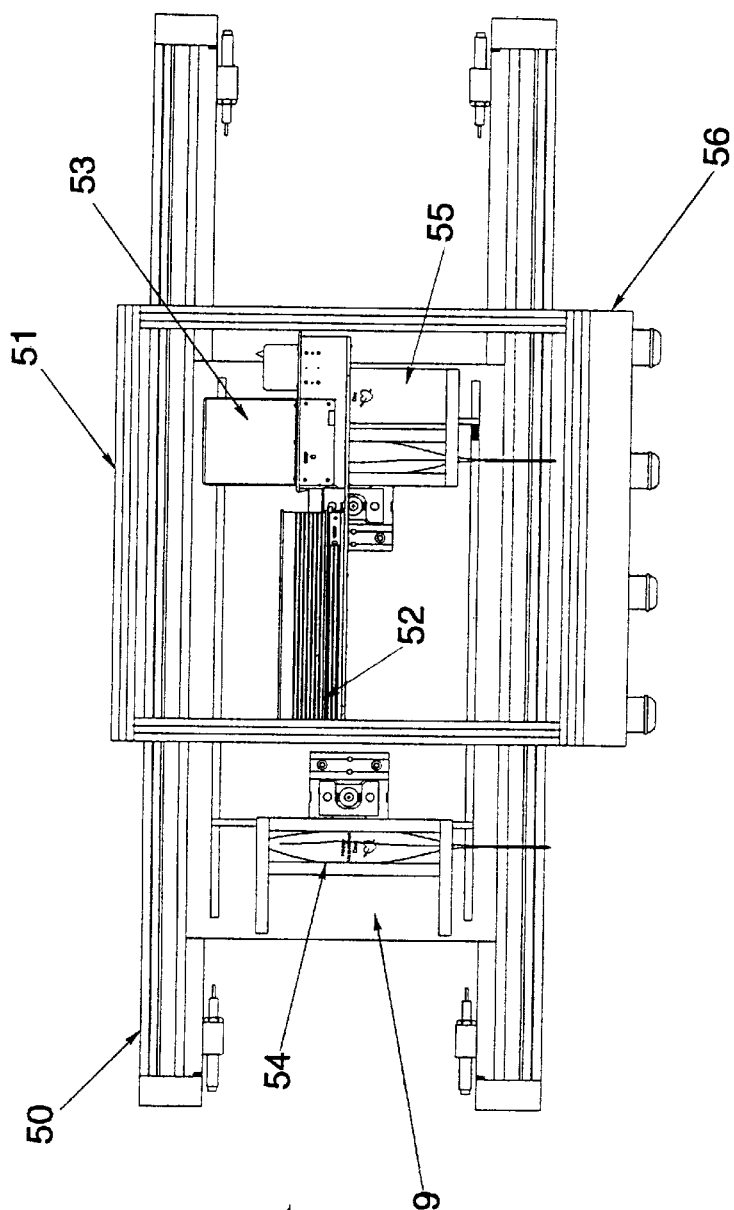
FIGS. 4A–C is a top view of a two position foliage marking system of the present invention.
Figure 4B:
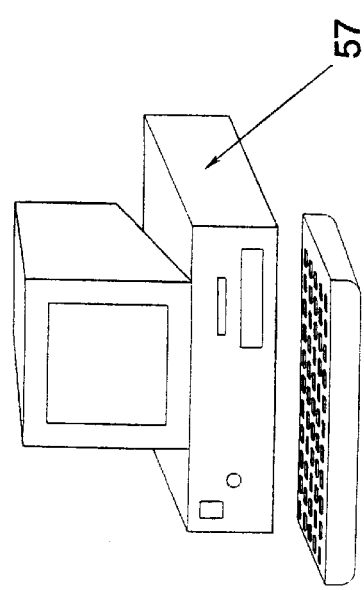
Figure 4C:
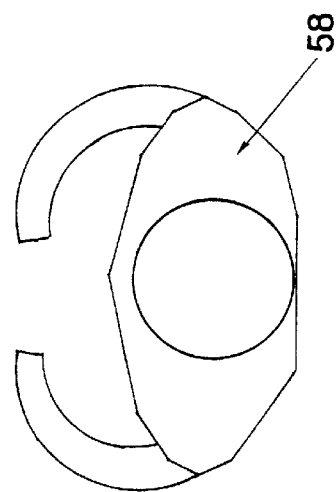

We turn now to the manual load/unload system of FIGS. 4A–C. This embodiment of said method includes a two position foliage load/unload shuttle for manually loaded and unloaded systems (Table 2). This type of system would be used either as a product design station whereby a foliage designer could easily experiment with various types of foliage, designs, and laser settings. Additionally, a manually loaded system could be used for production purposes when the product to be processed is too irregular in shape and/or size to be effectively handled with automated material handling or when low volume, custom product production is required. The later case would correspond to systems setup for manually assisted, on-demand production of custom marked/cut foliage that could include customer requested terms of endearment, artwork, and names on a leaf. This type of system could be used by floral shops or deployed at amusement parks, shopping malls, and other high pedestrian-traffic areas.

In the embodiment shown in Table 2 and FIGS. 4A–C, the manual load/unload system incorporates a dual station linear shuttle 50 such that an operator 58 could load product onto the shuttle outside of the mark/cut zone 54 while the laser is processing product inside the mark/cut zone 55. Alternatively, a linear or rotational shuttle incorporating more than two stations could be employed. The components as described below provides a method for manual load and unload of foliage and provides a method to accurately place the foliage during the load process with the design location such that uniformity of the processed foliage is improved.

Foliage is laser processed is the embodiment shown in Table 2 by having an operator load a leaf into the left hand side foliage clamp 54 extending out of the laser system structure. After a leaf has been loaded the operator 58 signals the control computer 57 by depressing the appropriate push button on the push button station 56. The shuttle base 59 is translated via a pneumatic or electric actuator such that the newly loaded leaf in clamp 54 stops underneath the laser mark/cut field. This condition is sensed by the control computer with an appropriate proximity switch. Laser processing of the foliage begins. During laser processing the operator 58 can remove a previously loaded leaf from foliage clamp 55 and place an unprocessed leaf into this clamp. When laser processing of the leaf in clamp 54 is complete and a new leaf has been loaded into clamp 55, the shuttle base 59 will translate to the left such that the clamp 55 is underneath the laser mark/cut field of view and the clamp 54 is positioned for the unload/load sequence.

Figure 5:
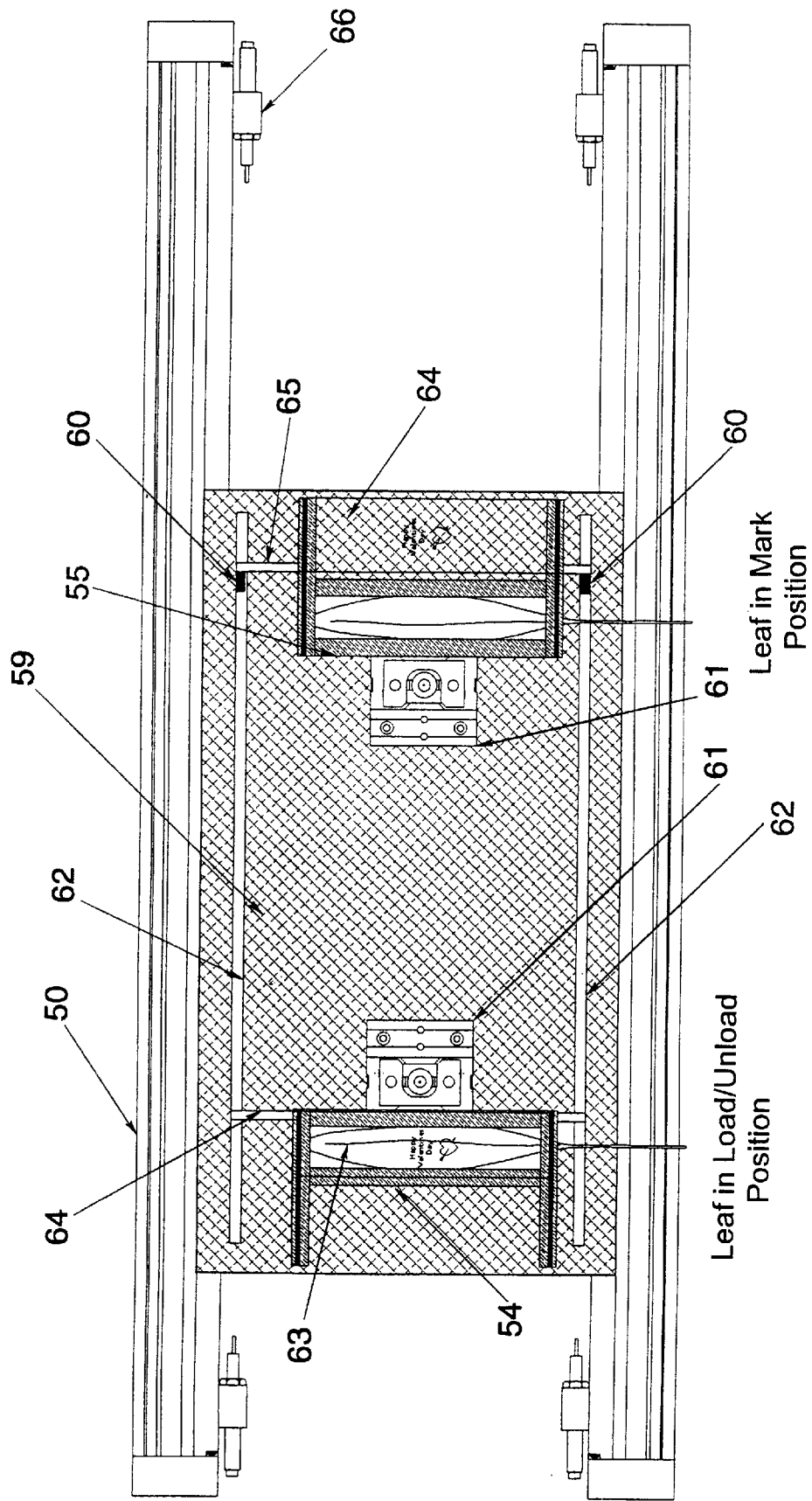
FIG. 5 is a top detailed view of the two position foliage marking system of the present invention.

The two position foliage shuttle, as embodied in the system shown in Table 2, is detailed in Table 3. This device provides a method to (1) have an operator load one leaf while a previously loaded leaf is being processed and (2) accurately align the leaf during the load process with the image to be marked or cut on the leaf. The shuttle incorporates a pneumatically or electrically actuated linear slide with dual linear bearings 50. Mounted to the linear bearings and moved by the actuation means is the shuttle base 59. The shuttle base provides a support surface onto which two foliage assemblies are mounted. Turning now to FIG. 5, each foliage clamp assembly consists of a pneumatically actuator 61, adjustable foliage clamp frames 54 and 55, design-template shutters 63 and 64, and two design-template cams 65.

The foliage clamp frames 54 and 55 as shown in this embodiment are rectangular in shape and do not occlude the mark/cut field of view. The foliage clamp frame incorporates compliant foam on foliage matting surface to minimize pressure on foliage. The foliage clamps can be exchanged with different sizes and shapes to accommodate a large variety of foliage to be processed. For instances, a cylindrical style clamp could be used when processing cigars.

Design-template shutters 63 and 64 are spring loaded, clear polycarbonate plate onto which the foliage design being marked and/or cut is etched so to be discernible by the operator. The template is incorporated into the foliage clamp above the clamp surface such that the position of the foliage being loaded relative to the design position can be viewed during the load operation. The position of the design on the polycarbonate shutter relative to the foliage clamp when the foliage clamp assembly is outside the laser field of view 63 corresponds to the exact location the design will be marked and/or cut when the leaf is in the laser field of view 64 and is maintained in this relative position due to the spring force. A template can be easily replaced with another template having a different design.

A template translates horizontally relative to the clamp fixture and out of the laser field of view (open position) when the clamp shutter assembly is translated into the laser field. This is accomplished with the two cam arms 66 that engage with fixed shutter stops 60. The cam arms, extending into two slots 62 machined into the shuttle base, force relative template—clamp fixture motion when the cam arms contact the shutter stops. When a foliage clamp assembly is in the load position the shutter is held directly over the foliage clamp via spring force (closed position). Template shutter 63 is shown in the closed position for foliage loading. Template shutter 64 is shown in the open state for laser processing.

Similarly, the manual laser marking/cutting of foliage can be accomplished using commercial laser engraving systems available from several different manufacturers. This type of system typically consists of a stationary $CO_2$ Laser and a two axis motion control system that carries mirrors and a focusing lens to effect beam motion on a surface parallel to the plane of the perpendicular axes. A commercial laser engraving system is typically controlled with a personal computer which downloads motion and power commands to the laser via a communications port. A commercially available laser engraving system is available from Universal Laser Systems, Inc., Scottsdale, Ariz. [See 1996, July. Vol. 1, Rev. B1, Section 4, FIG. 4.1, p37. Universal Laser Systems, Inc., Operation Manual. ULS-25E/ULS-25ER Laser System. Universal Laser Systems, Inc., Scottsdale, Ariz.].

This type of system can mark/cut material by moving the beam across the surface in a vector or raster fashion. Vector mode operation is suited for cutting the foliage. Raster mode operation is suited for marking a design on a leaf when the design is a bit mapped graphics or the design is to be 'filled in' to enhance its appearance.

Modifications of this type of system to facilitate foliage marking/cutting include A) the use of leaf clamps to flatten the leaf surface and register the leaf with the laser and B) cut outs in the engraving table to allow potted plants to be loaded into the laser engraving system cabinet and one of the plant's leaves secured by a leaf clamp.

Figure 6:
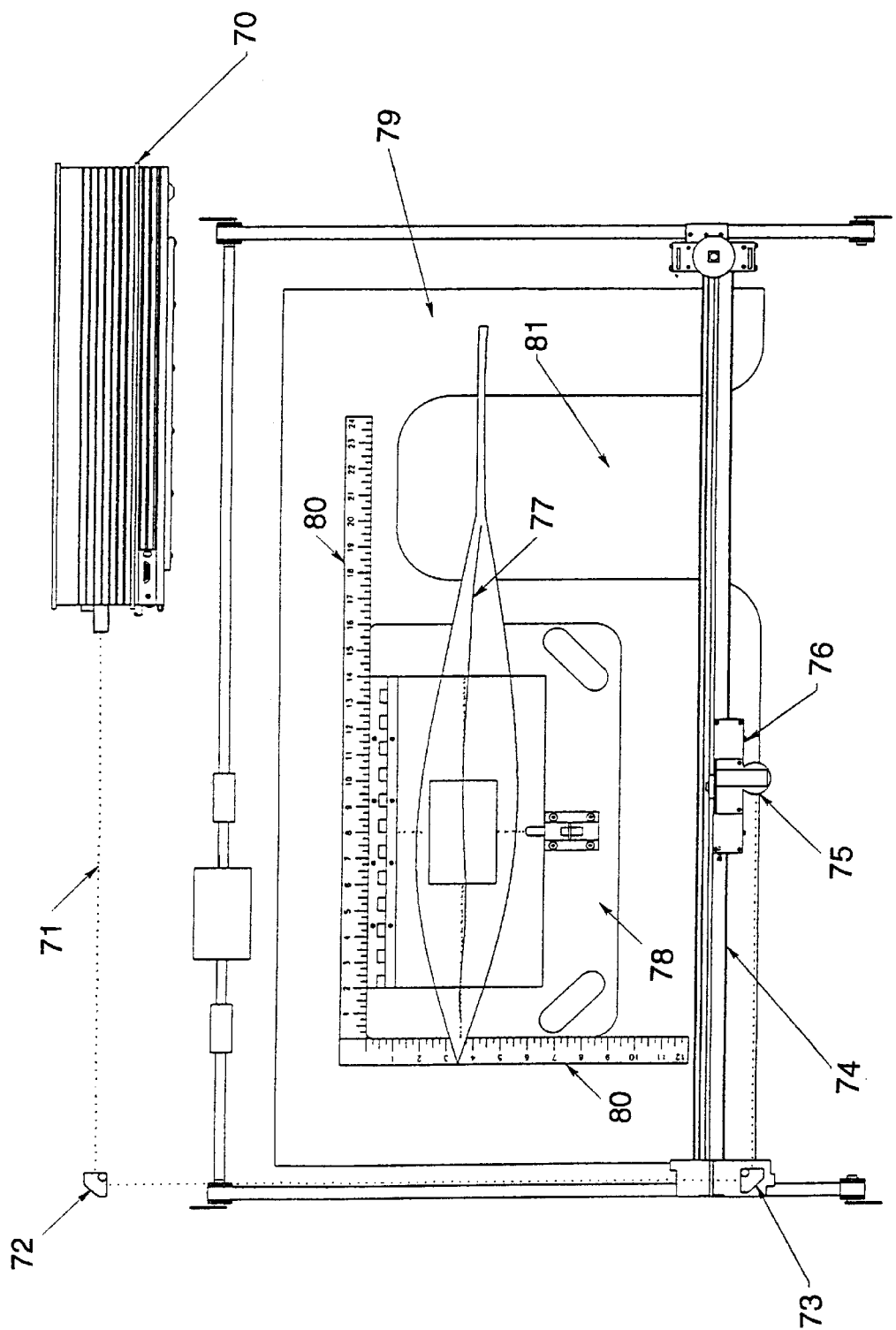
FIG. 6 is a top view of a stationary laser system of the present invention.

A top view of this type of system being utilized for leaf marking/cutting is shown in FIG. 6. This arrangement consists of a stationary laser 70, the emitted laser beam 71, a stationary right angle mirror 72 that reflects the beam to a second right angle mirror 73, mounted on the Y-Axis arm 74, that reflects the beam to the focus lens assembly 75 mounted on the X-Axis carriage 76. A leaf to be marked/cut 77 is loaded into the leaf clam 78 that is placed onto the engraving table 79. The engraving table is a flat aluminum plate that can be adjusted vertically to accommodate different thickness of leaves to be marked/cut. The leaf clamp is registered with the laser via X-Y registration guides 80 mounted on the engraving table. The engraving table includes a cut out 81 to accommodate potted plants placed underneath the engraving table.

Figure 7:
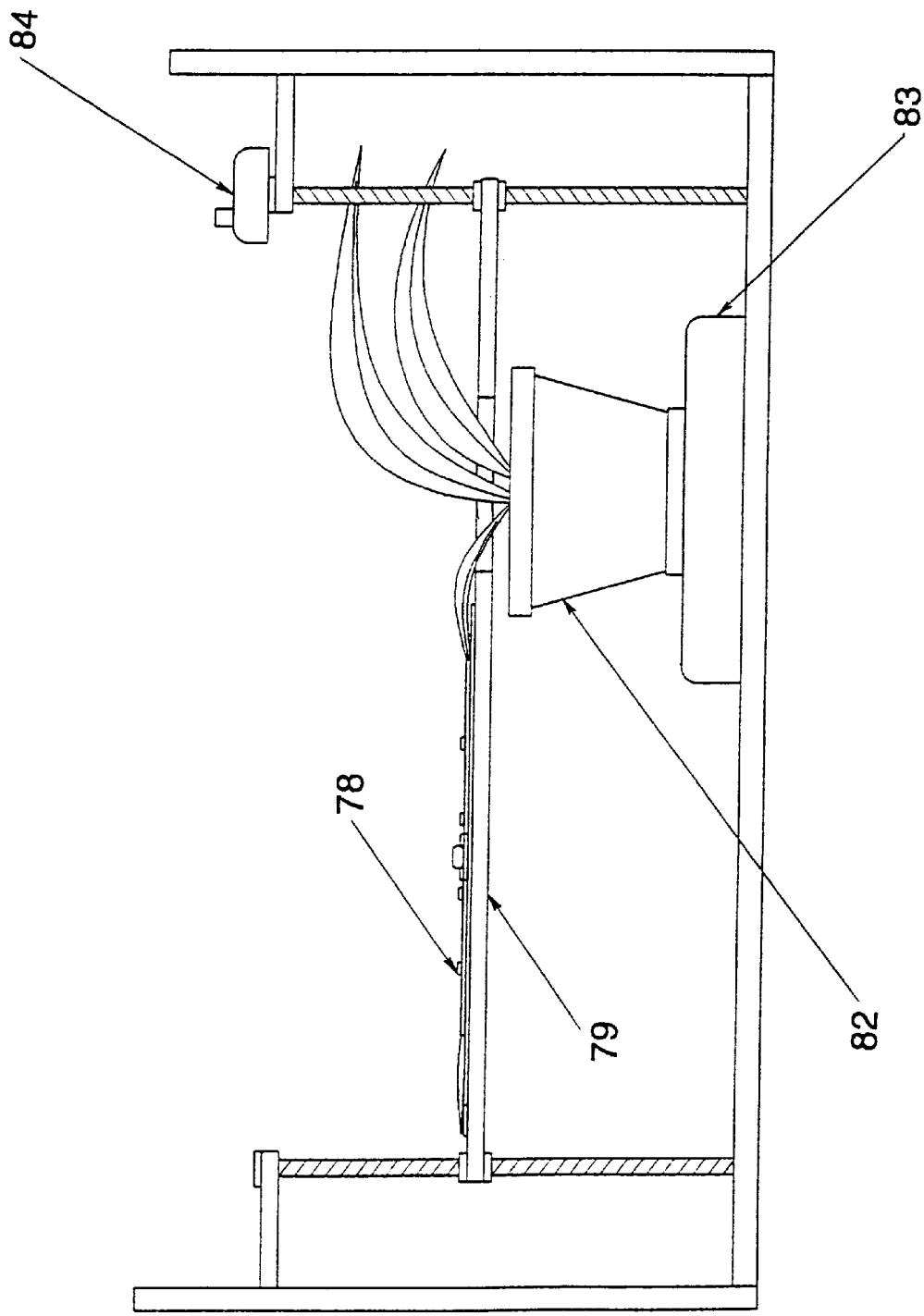
FIG. 7 is a side view of a stationary laser system of the present invention.

A side view of this type of system with a potted plant loaded for marking/cutting is shown in FIG. 7. A leaf from the potted plant 82 extends to the top surface of the engraving table 79 and is loaded into the leaf clamp 78. The potted plant is elevated to the appropriate height with support block 83. The elevation of the engraving table is adjusted via lead screw supports 84.

The leaf clamp, FIGS. 8A–E, is used in this system to A) register the leaf with the laser such that the intended design will be marked/cut on the desired area of the leaf and B) to flatten the surface of the leaf where the intended design is to be marked/cut to maximize the normality of the leaf surface with the laser and to minimize variations in distance from the focusing lens to the surface of the leaf. A sketch of a leaf clamp is shown in FIG. 5. The leaf clamp consists of an aluminum base plate 95 which is registered to the laser field of view by placing the base plate against the X-Y registration bars shown in FIG. 6. The leaf is flattened against the base plate by a hinged, clear acrylic aperture flap 86 with an aperture cut out to correspond to the area on to which the design is to be marked/cut. Different size and shape apertures can be incorporated into the aperture flaps to accommodate different leaf sizes and shapes and to provide larger or smaller marking/cutting areas as needed. The aperture flap is held against the base plate with a sliding clamp fixed to the base that engages with the top of the aperture flap on the edge of opposite from the hinge. When closed, the clamp sandwiches and flattens the leaf between the base and the aperture flap. Registration marks 90 on the base and aperture flap are used to assist in aligning the leaf into the leaf clamp. The aperture flap is attached to the base plate with a flat hinge 89. Grip cut outs 91 are machined into the base plate to provide a convenient means for handling the leaf clamp assembly. Additionally, a stem lot 92 is machined in the base plate to prevent excessive pressure on the leaf stem when the aperture flap is held closed by the sliding clamp. The corners and edges of the leaf clamp base are rounded slightly to remove sharp edges that could injure a worker while handle the leaf clamps.

The leaf clam assembly is aligned to the laser marking area with the two registration bars attached to the engraving table at 90 degrees to each other and slightly elevated from the engraving surface such that the leaf clamp base can be placed against the registration edges fixing the position of the leaf clamp in the laser marking area.

Figure 12:
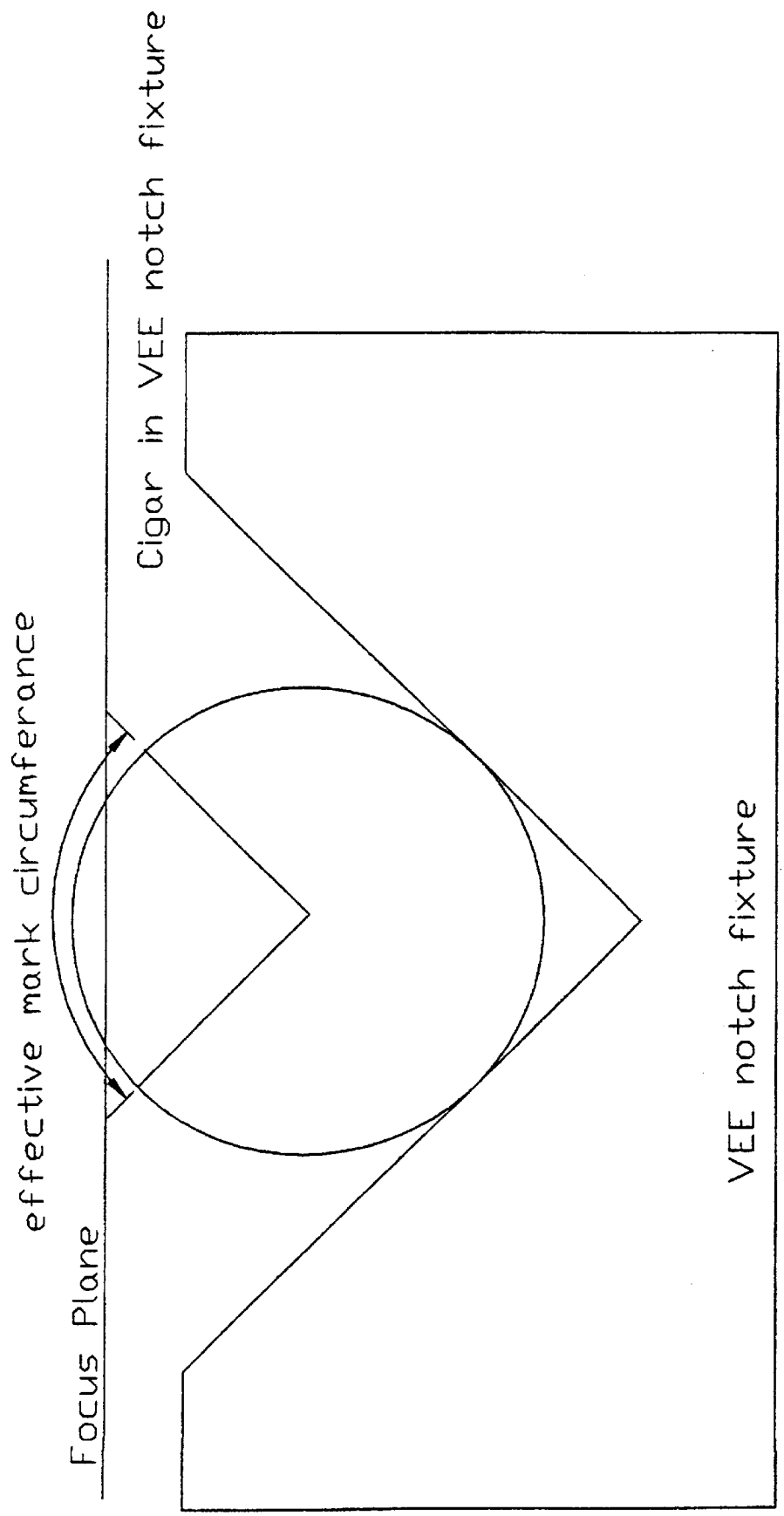
FIG. 12 is a diagram representing the VEE notch fixture for stationary cigar marking.

Although a number of procedures are the same, laser marking of cigars differs from the above-described laser marking of live or fresh cut foliage in certain ways. The first and most significant difference is the cigar's cylindrical form factor. This requires limiting the mark area to that portion of the cigar's surface that intersects with effective focus field of the laser system and which is sufficiently normal to the incident beam to allow for adequate interaction with the laser energy for marking. For cigars with calipers of ⅜" or greater laser marking is effective by placing the cigar in a VEE notch fixture as shown in FIG. 12 and focusing the beam in a plane that intersects the cigar slightly below the top surface. Depending on the cigar's caliper, effective marking can be achieved on the cigar surface from 90 to 45 degrees.

An interesting variation of this process is the marking of torpedo shape cigars. The caliper of these cigars tapers from one end to the other. Effective marking along the length of the cigar can be maintained by adjusting the distance from the cigar to the focal point via a stepper or servo driven device as the beam moves along the cigar's major axis.

Full circumferential marking of cigars can be achieved by fixturing the cigar in a spindle that rotates the cigar during the marking process. Rotating fixtures such as this are commonly used to mark other cylindrical objects such as writing pens and wineglasses. A rotating fixture can be employed to circumferentially mark standard and torpedo shaped cigars. When using a rotating fixture, beam position control must be coordinated with the cigar's rotation.

A second concern in cigar marking is the physiological state of the foliage. The cigar leaf wrapper has much lower moisture content than live or freshly cut leaves. Laser power and speed settings for effective cigar marking is more critical. Settings typical for cigar marking are listed below:

Laser Wave Length: 10.6 $\mu$m (CO2 Laser)

Laser Power: 2.5 w

Laser Speed: 30 in/s

Laser Spot Size at Cigar Surface: 0.005 in

Laser Pulse Rate: 500 pulse/in

Cigars can be marked with the same equipment used to mark fresh cut or live foliage (see FIGS. 3, 4, and 6) with minor modifications. The automated system presented in FIG. 3 can be used for mass production of laser marked cigars by utilizing a conveyor with VEE notched flights and appropriate cigar dispensing equipment commonly used in the cigar industry today to load unmarked cigars onto the conveyor. With automated cigar marking the leaf clamp (#29) would be replaced with a simple pneumatic fixture to register the cigar against a fixed stop prior to marking. Optionally, this fixture could include a rotating spindle if full circumferential marking is desired. Processing time could be in the 1 s to 10 s depending on complexity of mark.

The manual load system shown in FIGS. 4A–C is adapted for cigar marking by replacing the leaf clamps 54 with a VEE notched holding fixture or a rotating spindle. An operator would load and unload individual cigars into the VEE fixture or spindle.

Figure 9:
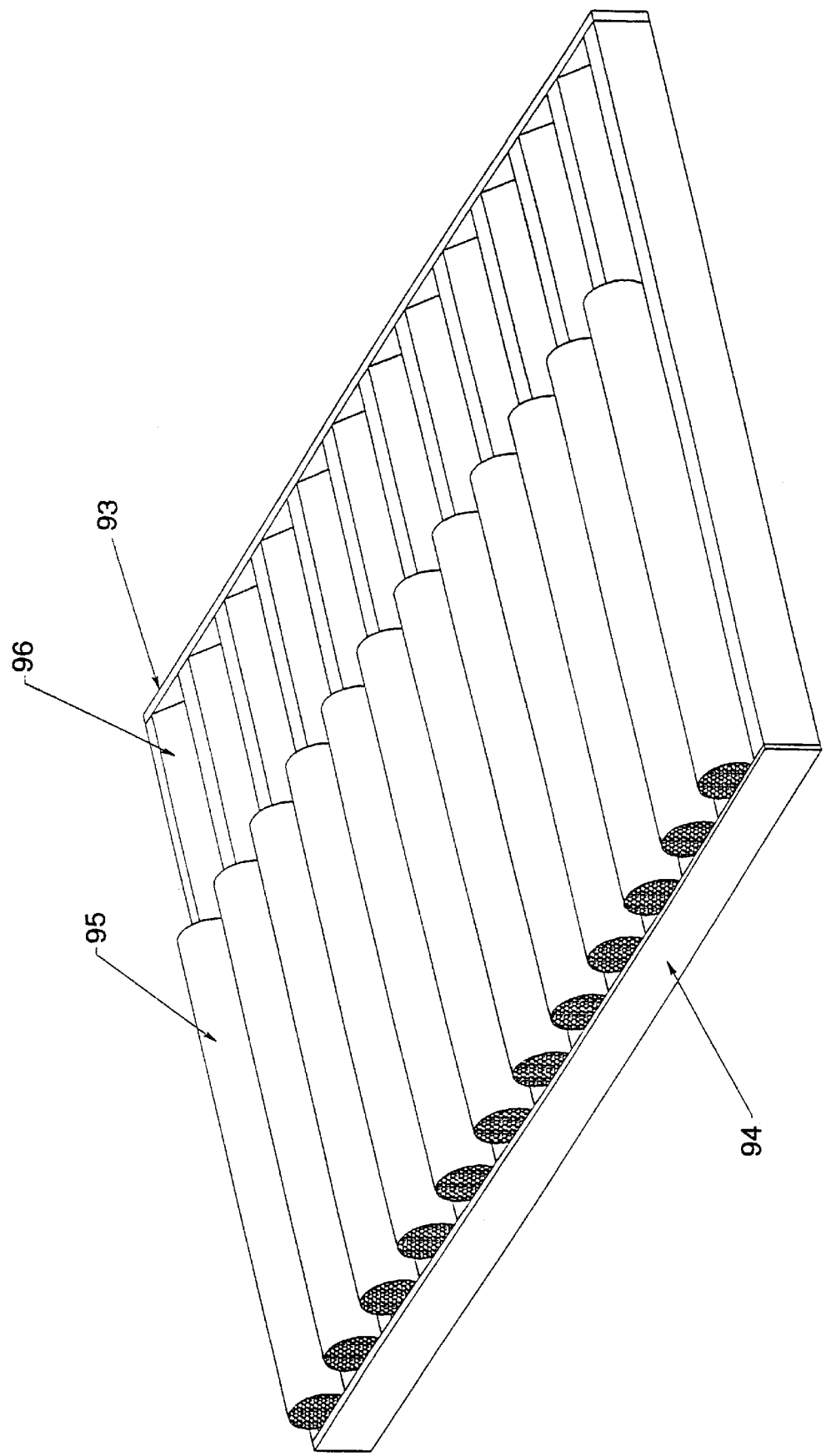
FIG. 9 is a perspective view of the tray for holding cigars or other tubular items for laser marking of the present invention.

The Cartesian marking system shown in FIG. 6 is adapted for cigar marking by replacing the leaf clamp 78 (FIGS. 8A–E) with a VEE notch fixture capable of holding multiple cigars as shown in FIG. 9. An operator would load multiple cigars into the stationary fixture and unload the cigars after marking. This device, preferably made from aluminum, utilizes vee-notched cavities 96 to hold multiple cigars 95 in repeatable positions. The cigars 95 are registered in the tray 93 when one end of the cigar contacts the registration bar 94. The filled tray 93 is placed onto the engraving table and registered with the laser by placing edges 94 against the registration bars on the engraving table. This cigar tray can be used to hold different length and diameter cigars.

Figure 10:
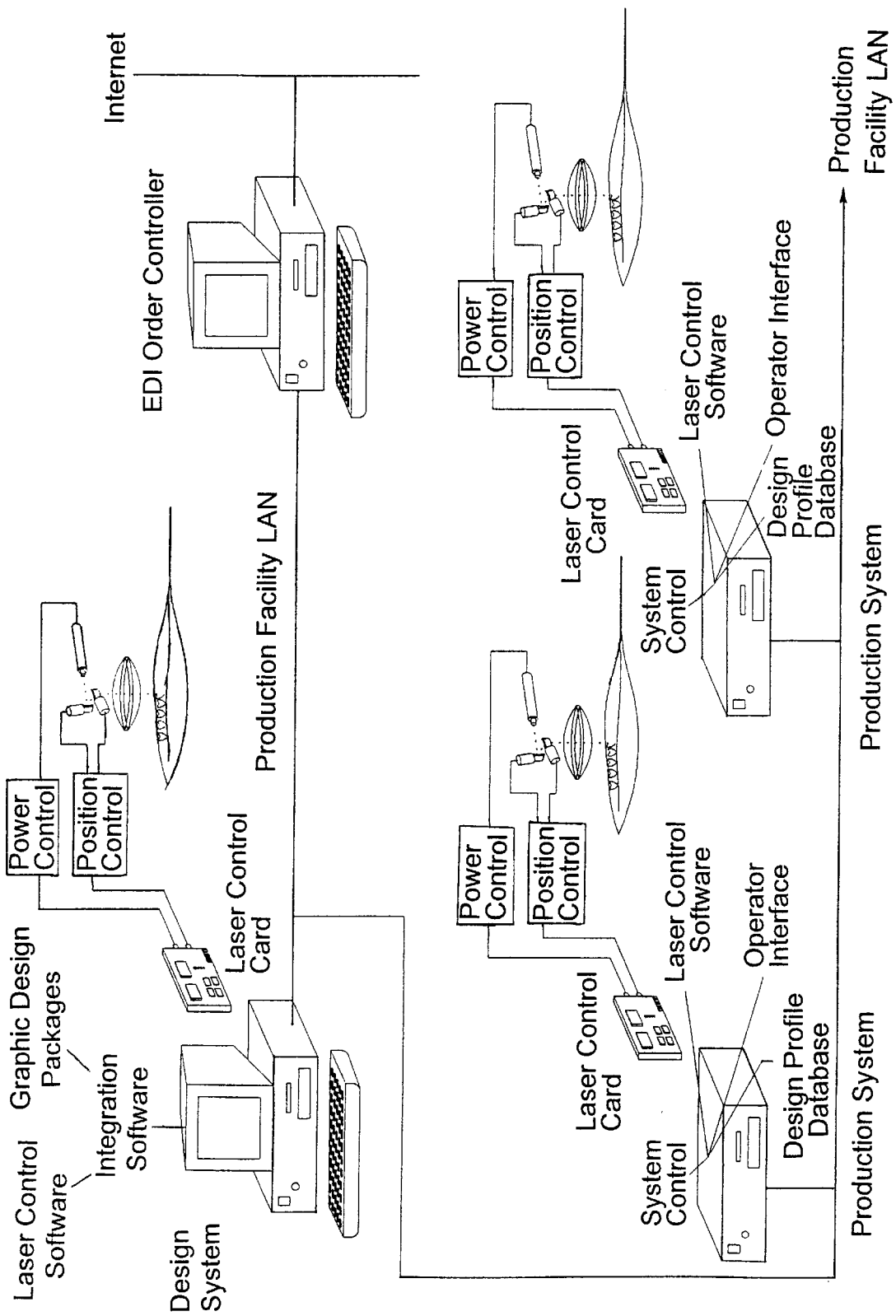
FIG. 10 is a modified block diagram of the software control for the present invention.

Turning now to the system software, shown in FIG. 10, it preferably provides overall system control and implements the drive signals to the laser and marking head to implement a desired design. In a product design embodiment of this system, various commercial graphic design applications and photographic processing applications are included to provide the designers with the necessary tools to develop new foliage designs. A graphical file created by these programs is translated into a design profile which encodes the graphic information into the fundamental laser marking head commands required to implement the design.

A design profile consists of a list of vector records and a list of bitmap records. A vector record consists of a laser start position, a laser end position, a translation speed, and a laser intensity setting established by laser power and laser pulse rate. Laser positions are specified as x-y coordinates in the laser field of view. A bitmap record consists of a laser position, a dwell time, and a laser intensity. A collection of vector records and bitmap records, referred to as the design profile, fully specifies the laser control required to implement a design.

A collection of design profiles is referred to as the design database. A production unit would store a design database from which an individual design profile could be retrieved when that design is to be put into production. Retrieving a specific design profile from all stored in the database would be through the operator interface. Thus, the need for graphic design software, graphic display monitors, and explicit, operator control of the laser functions are precluded in a production system. A layout of the software structure for this embodiment is shown in FIG. 10.

Figure 11:
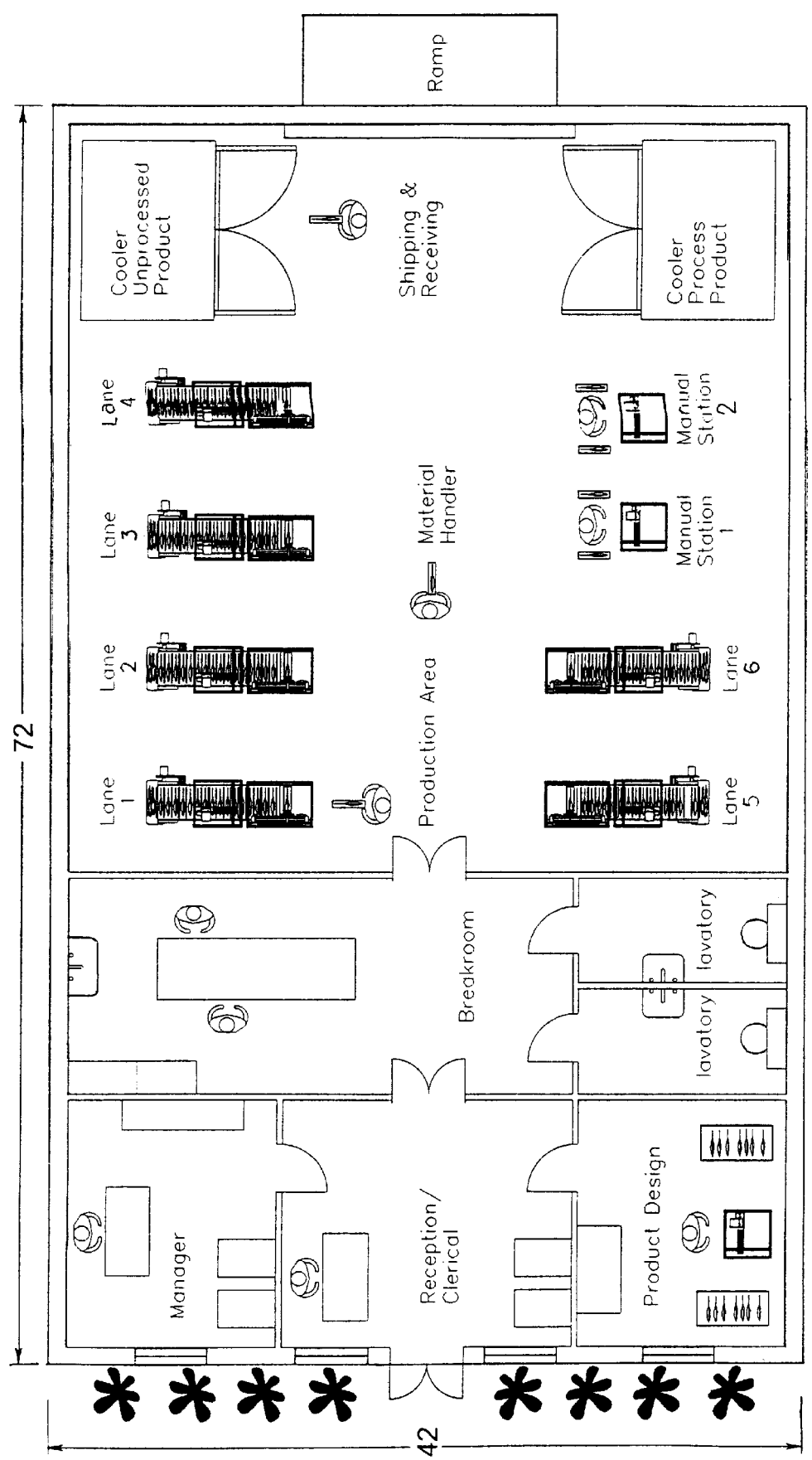
FIG. 11 represents a facility for operating the laser marking system of the present invention.

The methodologies described in this document can be incorporated into a production facility to achieve a high volume, highly flexible production environment. A layout of such a facility is presented in FIG. 11. In this embodiment, six automated production systems are used and two manual load production systems are used. Additionally, the facility includes a manual load system for a product designer.

Assuming an average process time for the automated units of 10 s per leaf, an average process time of 30 s per leaf for the manual load production units, and a 24 hr day operation, this facility could produce 58,000 leaves per day. Each automated unit could be devoted to different products as could each manual load unit. Each system could be interconnected through a LAN with the facility design system and an order processing computer to facilitate the download of orders, new designs, and custom designs. The facility could be connected to the Internet or other communication networks to facilitate the automatic download of orders and designs from customers.

The entire facility would be environmentally controlled and could include walk-in coolers for unprocessed and processed product. Such a facility could incorporate office space for management, clerical personnel, an office for the product designer, lavatories, and a break room. Additional labor requirements for this facility include material handling personnel (one per three to four stations), manual station operators, shipping and receiving personnel, and facility and equipment maintenance personnel.

Without further analysis, the foregoing will so fully reveal that gist of the present invention that others can, by applying current knowledge, readily adapt it for various applications without omitting features that fairly constitute essential characteristics of the generic and specific aspects of this invention and, therefore, such adaptations should and are intended to be comprehended within the meaning and range of equivalents of the appended claims.

What is claimed is:

1. A method for marking a substantially cylindrically shaped leaf wrapped product comprising the steps of:
   supporting a leaf wrapped product;
   applying laser energy at one or more predetermined intensities to said leaf wrapped product for marking thereof.

2. The method of claim 1 wherein said step of supporting comprises placing said leaf wrapped product in a notched fixture.

3. The method of claim 1 wherein said step of supporting comprises placing said leaf wrapped product in a rotating spindle.

4. The method of claim 1 wherein said step of applying said laser energy comprises affecting relative motion between said laser energy and said leaf wrapped product.

5. The method of claim 4 wherein said step of applying laser energy comprises modulating the intensity of said laser energy.

6. The method of claim 1 wherein said step of applying laser energy comprises the steps of:
   inserting a stencil with a predetermined design pattern between a stationary laser energy source and said leaf wrapped product; and
   focusing optics between said stationary laser energy source and said leaf wrapped product to burn said predetermined design pattern with said laser energy.

7. The method of claim 1 wherein said step of applying laser energy comprises focusing said laser in a plane that intersects said leaf wrapped product slightly below a top surface.

8. The method of claim 1 wherein said step of applying laser energy comprises applying said laser energy on said leaf wrapped product surface from about 45 degrees to about 90 degrees.

9. The method of claim 1 wherein said step of applying laser energy comprises applying laser energy along the length of said leaf wrapped product by adjusting the distance from said leaf wrapped product to the focal point by a stepper driven device as the laser moves along the leaf wrapped product's major axis.

10. The method of claim 1 wherein said step of supporting comprises placing at least one leaf wrapped product in a notched tray which is placed onto an engraving table, said tray registering with means to apply said laser energy.

11. The method of claim 3 further comprising rotating said leaf wrapped product to provide full circumferential marking.

12. The method of claim 1 wherein said step of applying said laser energy comprises configuring a CO2 laser with a laser wavelength of about 10.6 micrometers, a laser power of about 2.5 w, a laser speed of about 30 in/sec., a laser spot size at surface of about 0.005 in and a laser pulse rate of about 500 pulse/in.

13. A system for marking a leaf wrapped product comprising:
    means for supporting a leaf wrapped product;
    means for applying laser energy at one or more predetermined intensities to said leaf wrapped product for marking thereof.

14. The system of claim 13 wherein said means for supporting comprises a VEE notch fixture.

15. The system of claim 13 wherein said means for supporting comprises a rotating spindle.

16. The system of claim 13 wherein said means for applying said laser energy comprises means for affecting relative motion between said laser energy and said leaf wrapped product.

17. The system of claim 13 wherein said step of applying laser energy comprises means for modulating the intensity of said laser energy.

18. The system of claim 13 wherein said means for applying laser energy comprises:
    a stencil with a predetermined design pattern placed between a stationary laser energy source and said leaf wrapped product so that focusing optics between said stationary laser energy source and said leaf wrapped product burns said predetermined design pattern with said laser energy.

19. The system of claim 13 wherein said step of applying laser energy comprises focusing said laser in a plane that intersects said leaf wrapped product slightly below a top surface.

20. The system of claim 13 wherein said means for applying laser energy effective marks said leaf wrapped product surface from about 45 degrees to about 90 degrees.

21. The system of claim 13 wherein said means for applying laser energy comprises means for applying laser energy along the length of said leaf wrapped product by adjusting the distance from said leaf wrapped product to the focal point by a stepper driven device as the laser moves along the leaf wrapped product's major axis.

22. The system of claim 13 further comprising the means for automatically adjusting placement of said leaf wrapped product prior to applying said laser energy.

23. The system of claim 13 further comprising means for rotating said leaf wrapped product to provide full circumferential marking.

24. The system of claim 13 wherein said means for applying said laser energy comprises a CO2 laser with a laser wavelength of about 10.6 micrometers, a laser power of about 2.5 w, a laser speed of about 30 in/sec., a laser spot size at surface of about 0.005 in and a laser pulse rate of about 500 pulse/in.

25. A cigar marked by a method comprising the steps of:
    supporting a leaf wrapped product;
    applying laser energy at one or more predetermined intensities to said leaf wrapped product for marking thereof.

* * * * *